United States Patent [19]

Spieth et al.

[11] Patent Number: 4,680,510

[45] Date of Patent: Jul. 14, 1987

[54] COLOR MONITOR WITH IMPROVED SYNCHRONIZATION

[75] Inventors: Robert H. Spieth, Ronkonkoma; Chuen W. Louie, Richmond Hill; John L. Volk, Eatons Neck; Darrell D. Roelofs, Huntington Station; Anthony N. DeLorenzo, Ft. Salonga, all of N.Y.; Arthur L. Romeo, Los Angeles, Calif.; Thomas L. Mayer, Greenlawn, N.Y.

[73] Assignee: Hazeltine Corporation, Commack, N.Y.

[21] Appl. No.: 722,925

[22] Filed: Apr. 12, 1985

[51] Int. Cl.[4] .................. H01J 29/70; H01J 29/76
[52] U.S. Cl. .................................... 315/368; 315/371; 358/17
[58] Field of Search ................ 315/368, 371; 358/17, 358/18

[56] References Cited

U.S. PATENT DOCUMENTS

| | | | |
|---|---|---|---|
| 4,203,054 | 5/1980 | Sowter | 315/368 |
| 4,354,143 | 10/1982 | Judd | 315/368 |
| 4,401,922 | 8/1983 | Kamata et al. | 315/368 |
| 4,598,234 | 7/1986 | McKibben | 315/382 |

Primary Examiner—Theodore M. Blum
Attorney, Agent, or Firm—E. A. Onders; F. R. Agovino

[57] ABSTRACT

A color video monitor is disclosed which includes improved digital convergence using a plurality of memory means in which vertical convergence correction values are stored, one memory each for red, green, blue and lateral blue convergence values. Interpolation means provide additional values between the points stored in memory such that a smooth transition between successive lines of the display is achieved. The correction values stored in the memories are generated by means of a high-order polynomial function. The monitor employs synchronization circuitry which synchronizes all digital components to the supplied video signal including horizontal and vertical sync pulses and an external 36 MHz clock associated therewith.

7 Claims, 9 Drawing Figures

COLOR MONITOR WITH IMPROVED SYNCHRONIZATION

BACKGROUND OF THE INVENTION

The present invention relates generally to high resolution and high chromaticity color monitors and televisions. More particularly, the present invention relates to a novel digital system for providing the color convergence function for color monitors and televisions and for providing synchronization to a color signal and external clock.

In many military and industrial raster-scanned monitor applications, it has been found to be beneficial to display the monitored information on a video screen as color-coded graphics and alphanumeric data. While there are definite advantages to displaying color-coded data in military command and industrial control situations, such advantages could not heretofore be realized because, owing to the amount of data to be displayed on the screen, color monitor displays were not capable of sufficient resolution and color purity.

In fact, heretofore, monochrome video monitors actually outperformed conventional color displays in such areas as sharpness and legibility of data over the entire display surface; color control, convergence and reproducibility; adaptability to the human operator; immunity to shock and vibration; and performance stability over time.

In order to provide for the effective display of multicolored data and graphics on a color monitor, the monitor must produce very high true visual display resolution and accurately reproducible colors. The colors produced must be free of visible jitter, drift and misconvergence, on the entire display surface of the monitor screen, including the edges and corners. In such manner, the display parameters are controlled to optimize the ability of the operator to read the color-coded display data. In addition, such accuracy of display must frequently be maintained under adverse environmental operating conditions.

The achievement of such characteristics provides high legibility and accurate reading of high density display data typically found in military command and control applications. In such applicatins, as well as various other industrial and transportation control enterprises, characters, complex symbols and other details must be small to minimize the overlapping and unreadability of the data. The display quality of monitors built to achieve the above characteristics equals or surpasses that of the best monochrome monitors of comparable size, while providing the additional benefits of color-coding.

Military command and control systems are increasingly required to cope with dense target environments requiring rapid processing, display and decision-making on large amounts of data. The display system must present the data to the operator in a form which enables him to quickly and accurately identify and track items of interest amid the clutter and overlapping of many or similar-appearing items. Further, such items are constantly changing positions, with the frequent, random appearance of new items, usually near the edges of the display.

Color-coding of the display data can improve operator accuracy, shorten his reaction time and lessen his fatigue, serving as a highlighter and an aid to discrimination of similar-appearing data in a dense display. Such benefits have encouraged increased use of color displays, both in military applications, and also civilian activities, such as air traffic control systems.

Prior to the present invention, several parameters of color display performance have been less then satisfactory than those of monochrome displays for such usage. The present invention has resulted in significant improvements that are necessary in order to achieve any benefit from the addition of color-coding. Such improvements are in the areas of legibility, that is, the crispness and readability of the data; chromaticity, that is, color control for optimum human perception and readability; and color convergence, that is, the coincidence of position of primary colors and performance stability over time. The color monitor described generally, and the convergence circuit specifically described herein, achieve such performance goals.

The digital convergence and synchronization circuitry of the present invention is designed to provide a highly legible display, as well as to display selected colors controlled to close tolerances. The three primary colors, red, green and blue, are converged to within less than a line thickness. That is, misconvergence of approximately 0.015 inch for an 0.018 inch line thickness is achieved. Unlike prior art color monitors, the present invention achieves such performance over the entire display area, not just a center "quality circle" area of the display.

The above-described legibility is achieved according to the present invention by providing a uniform spot size of 0.015 inch without Moire effects and a color misconvergence of less than approximately 0.012 inch over the entire display surface, including the edges. Such values are achieved regardless of operator settings of the brightness and contrast controls. The effective resolution of the display is approximately 750H×1000V, or 750,000 pixels, on a nominal 11 inch H×14 inch V display.

Conventional monitors do not meet such legibility criteria since typical spot size averages about 0.025 inch and misconvergence can be up to 0.040 inch over the entire display surface. Typical specifications for those monitors which describe their resolution as 1280H×1024V actually indicate the addressability or number of spot positions, rather than resolution (visual discrimination of adjacent spots). In reality, the true resolution of such monitors is about 600H×450V, or 270,000 pixels, or about one-third of that achieved by the color monitor of the present invention. Furthermore, misconvergence can further degrade that resolution and hence the legibility near the periphery of the display.

SUMMARY OF THE INVENTION

In view of the foregoing, it should be apparent that there still exists a need in the art for a color monitor having highly accurate digital convergence synchronization circuits such that the display exhibits a high degree of legibility and color resolution. It is, therefore, a primary object of this invention to provide a color monitor having convergence and synchronization circuits resulting in a display which exhibits a high degree of legibility and color resolution and which has particular application in military command and control environments, as well as in civilian environments.

More paticularly, it is an object of the present invention to provide a color monitor having color convergence circuitry capable of providing a highly accurate and precise color convergence function such that the misconvergence is approximately 0.012 inch over its entire display.

Yet another object of the present invention is to provide a color monitor having a color convergence circuit constructed of digital circuit components synchronized to a color video signal and external 36 MHz clock such that it can operate accurately under adverse environmental conditions.

Yet another object of the present invention to provide a color monitor having a color convergence circuit which utilizes a 3 bit code to provide up to eight different colors, including black, on its display.

It is still yet another object of the present invention to provide a color monitor having a color convergence circuit which utilizes a color convergence correction values stored in memory to produce a display having an extremely low misconvergence.

It is a further object of the present invention to provide a color monitor which uses a color convergence circuit having color convergence correction values calculated by means of a highly accurate fourth-order polynomial equation.

Briefly described, these and other objects of the present invention are accomplished by providing a color monitor having a digital color convergence circuit which generates highly accurate convergence waveforms by means of a high-order polynomial equation. Those waveforms, which are digitally generated and then converted to analog form, are applied to the convergence coils around the neck of the CRT. Such waveforms and coils further include blue lateral convergence to achieve a high degree of convergence precision. Convergence correction factors are calculated by the circuitry by reference to stored values in an on-board memory, which may be of the EPROM type. Those stored values were calculated by means of a high-order polynomial equation to be described in greater detail hereinafter.

The digital convergence circuit comprises a vertical parabola and sweep generator, red, green and blue convergence generators, and a blue lateral convergence generator. The vertical sweep signal is developed digitally by a D/A converter whose input reflects the desired sweep amplitude at the D/A output. The input to the D/A converter is generated by an address counter whose output is modified stored EPROM data used for centering the vertical sweep. In order to achieve a high degree of convergence, an "S" correction is added to the vertical sweep, by means of a second D/A converter. The output of that second D/A converter is applied to the sweep D/A converter to provide the vertical "S" correction.

The output of the "S" correction D/A converter is established by an EPROM data output. The EPROM address data is generated by the same address counter used to generate the vertical sweep. A third D/A converter, connected to the output of the "S" correction EPROM, produces the vertical parabola (VPAR) signal.

The digital convergence circuitry of the present invention is designed to be used with a standard three gun CRT color tube in which the axes of the red and green guns are oriented at 120° apart from each other. Such tubes require four convergence driver signals, red, green and blue, and blue lateral signals.

The red convergence driver signal is used to adjust the position of the red dot along the red diagonal. The green convergence driver signal is used to adjust the green dot position along the green diagonal, which is 120° away from the red diagonal. The blue convergence driver signal adjusts the blue dot position along the vertical line. Finally, the blue lateral driver signal is used to adjust the blue dot position along the horizontal line.

The synchronization circuitry synchronizes all digital components to the supplied color video signal including horizontal and vertical sync pulses and an external 36 MHz clock associated therewith.

For a better understanding of the present invention, together with other and further objects, reference is made to the following description, taken in conjunction with the accompanying drawings, and its scope will be pointed out in the appended claims.

DETAILED DESCRIPTION OF THE PREFERRED EMBODIMENT

Figure 1:
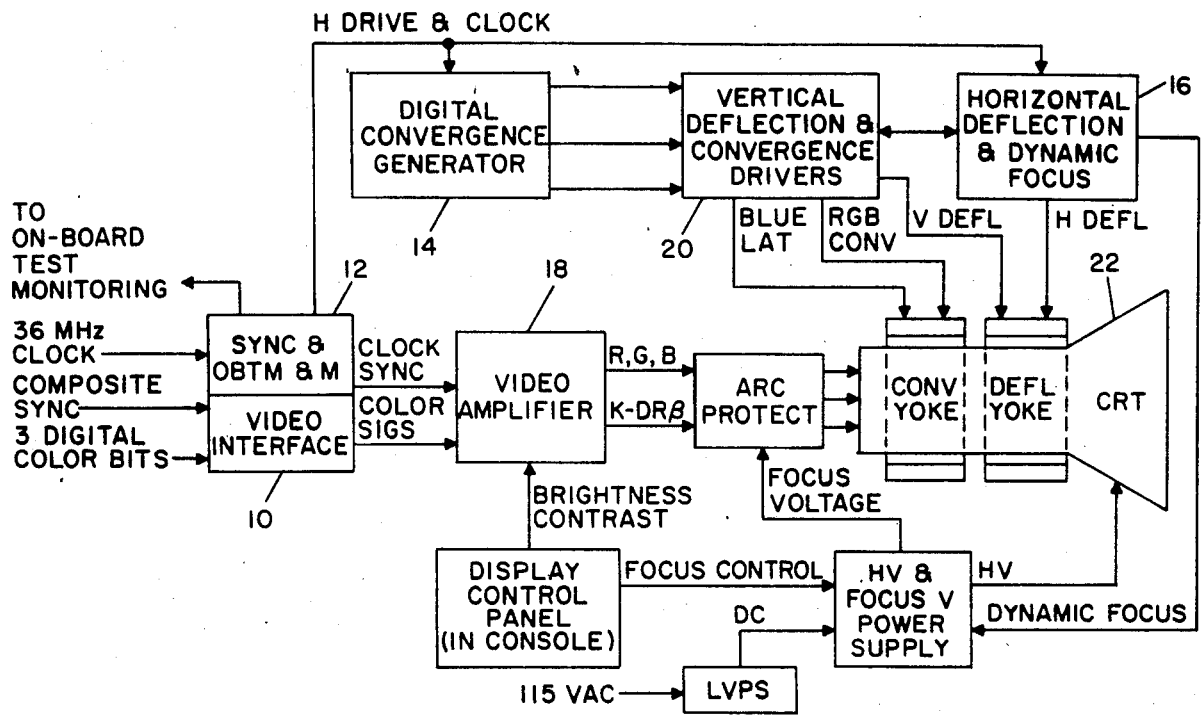
FIG. 1 is a block diagram of the circuitry of the color monitor of the present invention.

At the outset, it should be pointed out that circuits which perform the functions indicated in the blocks of FIG. 1 are known to those of ordinary skill in the art, and others, for use in color monitors. Thus, only certain portions of that circuitry have been described in detail herein, so as not to unnecessarily obscure the present invention.

COLOR MONITOR

Referring now to the various drawing figures, in which like elements are indicated by like reference numerals throughout, there is shown in FIG. 1, in schematic block diagram form, the color monitor of the present invention. The color monitor receives, through its video interface and synchronization and on-board test circuits 10 and 12, respectively, a 36 MHz clock signal, composite sync signal and a three digital bit color signal, and thus is capable of reproducing eight different colors. A horizontal drive and clock signal is provided to the digital convergence generator 14 and also to the horizontal deflection and dynamic focus circuit 16.

The general functioning of the remaining circuitry shown in FIG. 1 is believed to be known. However, the video amplifier circuitry 18 is the subject of a co-pending U.S. patent application, Ser. No. 06/722,959, filed concurrently herewith and commonly assigned to the assignee of this application. The disclosure of that patent application is hereby incorporated as if set forth in full herein.

DIGITAL CONVERGENCE CIRCUIT

Figure 2:
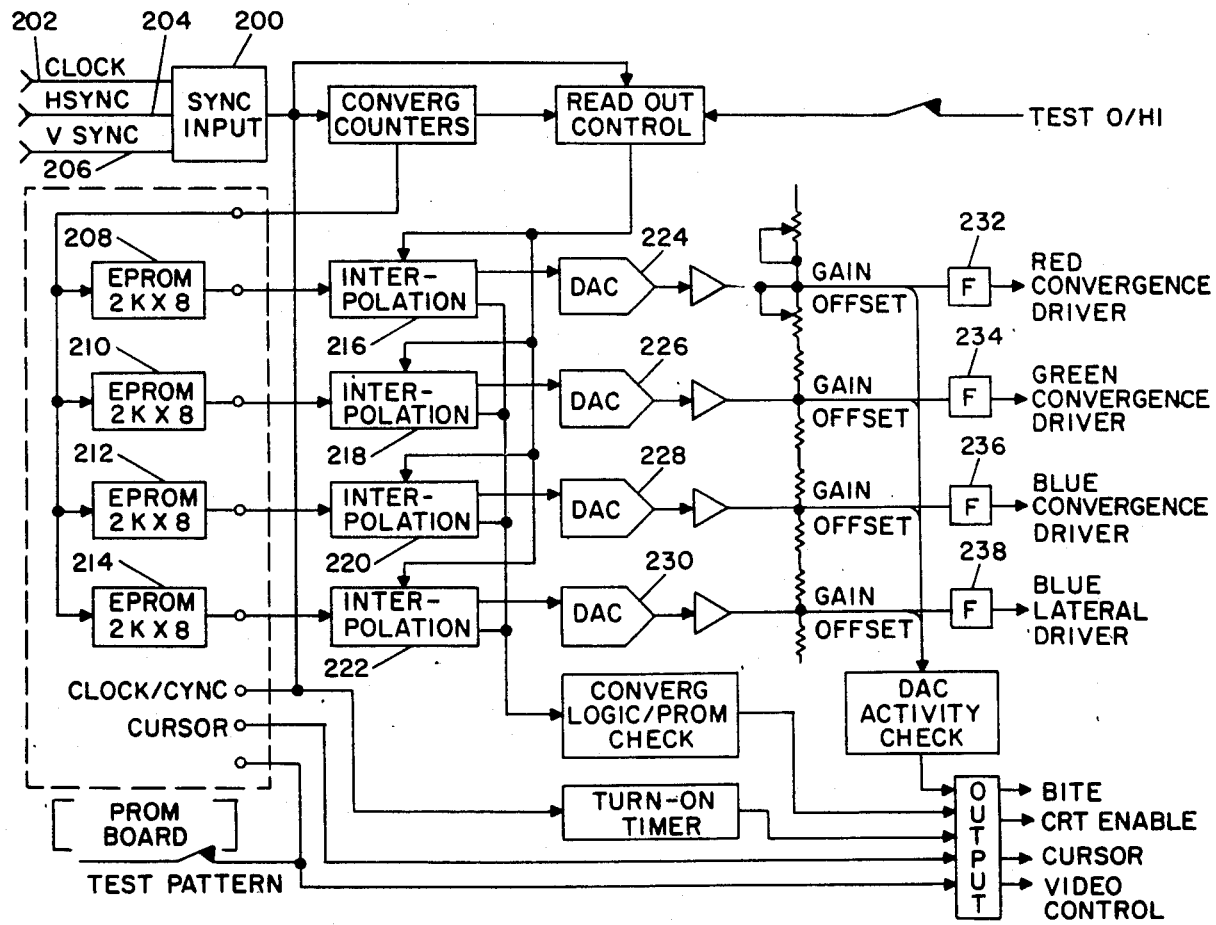
FIG. 2 is a block diagram of the digital color convergence circuitry of the present invention.

FIG. 2 illustrates, in block diagram form, the circuitry of the digital convergence generator 14. The SYNC input receives three signals from elsewhere in the color monitor. These signals consist of a 9 MHz clock signal 202 derived from the 36 MHz pixel clock, a horizontal sync pulse 204 and a vertical sync pulse 206. The 9 MHz clock and the horizontal sync signals are synchronized with each other and may be adjusted in time with respect to the horizontal sync signal used in the deflection circuits 16 and 20 shown in FIG. 1. The adjustment provides a one pixel resolution and is used to align the convergence waveform with the deflection waveform.

Four EPROMs 208, 210, 212, 214, contain a matrix of 63 by 30 vertical convergence values which are generated as described in more detail hereinafter. However, the effective matrix stored in those EPROMs is actually 63 by 480 because of the use of the interpolators 216, 218, 220 and 222. Since there are 30 basic vertical convergence values and 480 lines of information, each vertical convergence value is used to converge 16 lines of information. Thereafter, the next vertical convergence value is used to converge the next 16 lines of information.

The interpolators 216, 218, 220 and 222 interpolate from one vertical convergence value to the next such that a fairly smooth convergence change from line to line occurs. For example, if point (1,1) has a convergence value of 216 volts and point (17,1), which is 16 lines below point (1,1), has a convergence value of 190 volts, then point (2,1) would have a value of 215 volts, point (7,1) would be 210 volts and point (16,1) would be 191 vertical volts. That is due to the fact that interpolators 216, 218, 220 and 222 interpolate between the successive vertical convergence values so that a smooth convergence from line to line is achieved.

Similarly, smoothing filters 232, 234, 236 and 238 are fed the analog driver signals from the digital-to-analog converters 224, 226, 228 and 230, to smooth the voltage values between successive pixels so that a smooth transition of convergence values between successive pixels during horizontal scanning is also achieved.

Figure 3:
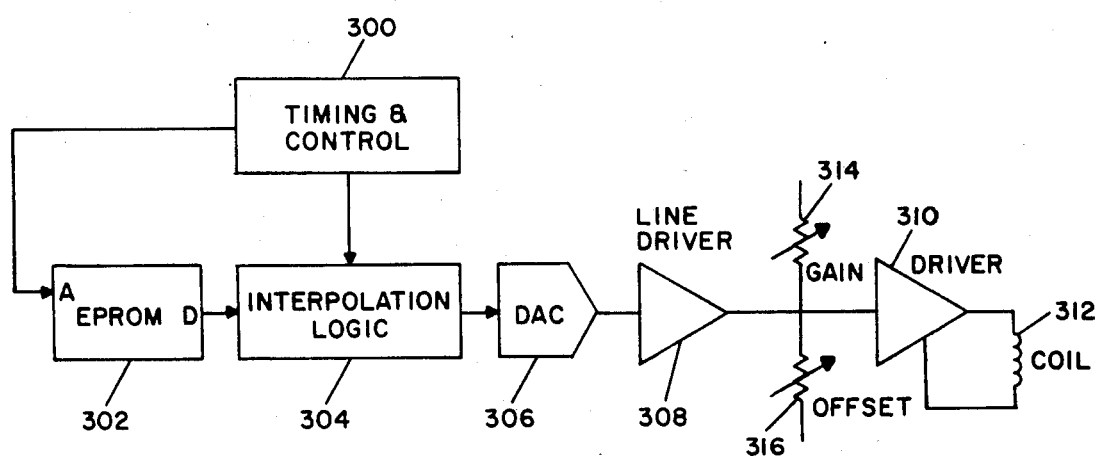
FIG. 3 is an operational block diagram of one of the four color convergence circuits contained in the digital color convergence circuitry of FIG. 2.

A simplified diagram illustrating the operation of the digital convergence circuitry is shown in FIG. 3. The timing and control circuitry 300 initiates the generation of a convergence value for each waveform by reading an initial value from the EPROM 302. It should be understood that, as shown in FIG. 2, there are four such FIG. 3 circuits incorporated in the digital convergence circuitry 14 of the color monitor. One "channel" each for red, green and blue convergence, and the fourth for blue lateral convergence. Thus, as shown in FIG. 2, each "channel" utilizes a unique EPROM of 2K bytes.

The eight bit convergence value output from EPROM 302 is applied to the interpolation logic circuitry 304, which may consist of arithmetic logic units. The interpolation logic circuitry 304 also includes a RAM 400, (shown in FIG. 4), in which a data file is stored. The data file is also inputted to the ALU's and the resultant ALU outputs are latched and applied to a digital-to-analog converter 306. The digital-to-analog converter 306 develops an associated analog convergence voltage which is applied, through drivers 308 and 310, to the appropriate convergence coil 312 on the CRT 22. Each convergence coil 312 (only one is shown for simplicity), develops a magnetic field that converges the three CRT cathode color outputs to ensure that the three colors impinge at the proper dot location on the screen phosphor of the CRT 22. Potentiometers 314 and 316 are provided to perform convergence digital-to-analog output waveform gain and offset functions, respectively.

Figure 4:
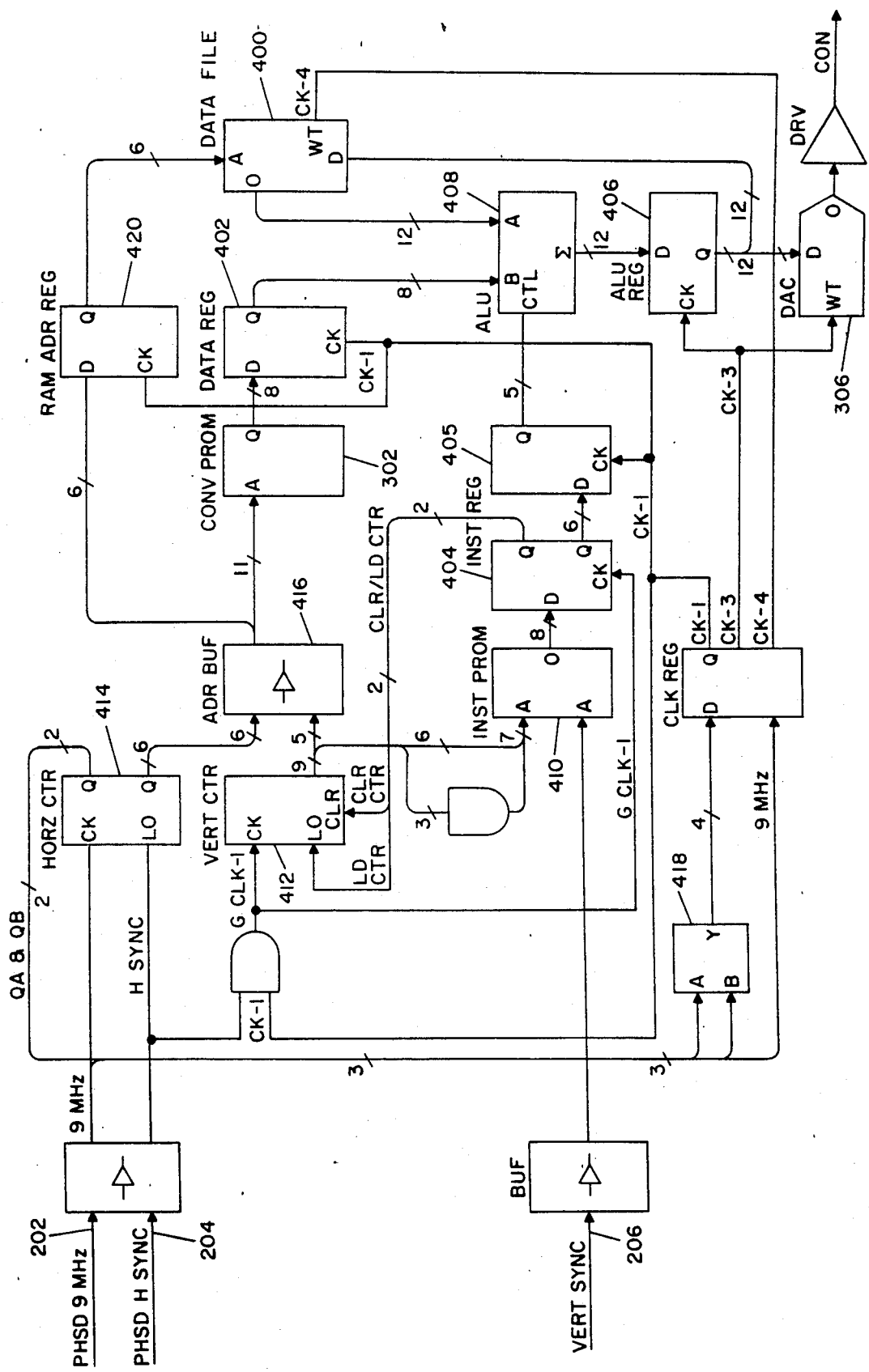
FIG. 4 is an electrical block diagram of the digital color convergence circuit used in the color monitor of the present invention.

In FIG. 4, each convergence waveform is generated by reading an initial value from the respective convergence EPROM 302 for each of 63 data points along the horizontal direction, 53 in active time and 10 in blanking. Those initial values, with 8 bit resolution, are passed to the data file or RAM 400 by means of data register 402, ALU 408 and ALU register 406, and shifted to the eight most significant bit positions. That set-up procedure occurs for each field during the vertical blanking period.

Two lines prior to the first line of video, the instruction register 404 begins to read delta values from the convergence EPROM 302. Sixty-three increment values are read during each horizontal line and are added to the 63 values stored in the data file 400. Those 63 sums are stored in the data file 400, replacing the previously stored values. Thus, the data file 400 always contains the current value of the amplitude of the waveform.

The first set of 63 delta values are used for the first block of 16 horizontal lines. The address to the convergence EPROM 302 is then stepped to read a second set of 63 delta values that are to be used for the second block of 16 horizontal lines. The convergence EPROM 302 address is stepped 29 times after the initial block, for a total of 30 sets of delta values associated with 30 blocks of 16 horizontal lines. A total of 480 lines of data points are thus generated. Therefore, the waveform which began two lines before the first line of video will end three lines after the last line of video in each field. The ALU register 406, at the output of the ALU 408, presents data to the data file 400. It also presents the 8 most significant bits to the digital-to-analog converter 306, which generates the analog waveform sent to the convergence coil drivers 308 and 310 described above.

As was discussed in connection with FIG. 3, the circuitry shown in FIG. 4 and described hereinabove is repeated four times, one for each of the red, green, blue and lateral blue waveform generators. The operation of those four circuits occurs in parallel and is controlled by one common set of timing and logic circuits, to be described immediately hereinafter.

The signals inputted to the digital convergence timing and control logic shown in that portion of FIG. 4 not yet described, consist, as has been previously described, of a 9 MHz clock signal 202, a horizontal sync pulse 204 and a vertical sync pulse 206.

When a vertical sync pulse 206 is received, the instruction PROM 410 outputs through each instruction register 404, a command to load the vertical counter 412 with a predetermined address. When this address is presented to the instruction PROM 410, it will only cause the ALU 408 output to be zero. This is accomplished by the connection of the instruction PROM 410 through the instruction registers 404 and 405, to the ALU 408.

The zero output of the ALU 408 clears the contents of each of the data files 400. This action continues until the vertical sync pulse ends, at which time the setup sequence described above begins. That operational sequence was specifically designed to operate in that manner during the vertical sync period since that period is not always a fixed number of horizontal lines. The vertical sync period will thus be 5±horizontal periods, depending upon which field precedes it and whether a refresh channel resync has occurred.

After the setup sequence, the vertical counter 412 is cleared and the actual waveform generation then begins as previously described. The vertical counter is clocked once during each horizontal line. The five most significant bits make up part of the convergence PROM 302 address and all bits to the instruction PROM 410.

The horizontal counter 414, which is connected to receive both the 9 MHz clock signal 202 and the horizontal sync pulse 204, is cleared by synchronously loading zeros at the same time the vertical counter 412 is clocked. Thus, each horizontal sequence is begun coincident with the change of vertical address. The two least significant bits of the 8 bit horizontal counter 414 are used to generate clock pulses that strobe address and data registers 416 and 418 at the proper times in the horizontal sequence.

The six most significant bits of the horizontal counter 414 provide part of the convergence EPROM 302 address and also the address of the data file 400. That is accomplished by feeding the Q output of the horizontal counter 414 to the address buffer 416, whose output is connected to both the convergence EPROM 302 and the RAM address register 420 connected to the data file 400. Thus, the address of the convergence EPROM 302 and data file 400 change at a rate of 9 MHz divided by four, which equals 16 pixel positions on the raster. That provides 63 addresses for each horizontal line.

An important aspect of the operation of the convergence circuitry is the values stored in the convergence EPROM 302. It is those values, which, when summed with the corresponding data values stored in RAM 400, allow the color monitor of the present invention to produce a misconvergence characteristic of 0.012 inch. The values contained in the convergence EPROMs are calculated in accordance with a fourth-order polynomial equation for each sample point. That equation is:

$$F(X,Y) = A(BX^4 - CX^2)Y^2 + D(EX^3 - FX)Y^2 +$$
$$GX^2 + H(X - X^2) + I(JY^4 - KY^2)X^2 + L(MY^3 -$$
$$NY)X^2 + OY^2 + P(Y - Y^2) + QX^2Y^2 + R;$$

where: the center of the matrix is (O,O); and different major coefficients (for example, A and D), are used for each half or quarter of the matrix.

The foregoing equation replicates that used by analog convergence circuitry, but additionally adds two more orders of correction for more precise convergence values. The correction information stored in the EPROMs may be generated individually for each monitor by placing the monitor in a test set-up utilizing circuitry in addition to that shown in FIG. 2. Four RAMs are substituted for the four EPROMs 208, 210, 212 and 214 and the information contained therein, which is calculated in accordance with the above-described equation, is adjusted by an operator.

The operator uses predetermined adjustment points to generate the final convergence information to be stored in the RAMs. Twenty-nine points in a predetermined sequence are evaluated by an operator while a cross-hatched pattern appears on the screen. The convergence values are then adjusted until a satisfactory display is achieved.

Therefore, the information stored in the RAMs is dumped into the EPROMs for permanent storage and use with the individual monitor that was tested. Reference is also made herein to commonly assigned U.S. patent application Ser. No. 06/671,137, filed Nov. 13, 1984 and entitled: "Uniformity Correction for Color CRT Display," for additional information regarding the generation of the EPROM data. The contents of that application are incorporated herein as if fully set forth in its entirety.

SYNCHRONIZATION CIRCUIT

As shown in FIG. 1 synchronization block 12 receives a 36 MHz clock signal, a composite sync signal including horizontal sync and vertical sync pulses and 3 color signals of 3 digital bits each. These signals come from the apparatus, such as radar, which is generating the input information. The composite sync and digital video signals are generated from an analog video signal from which the sync pulses are detected and the video information is converted to digital video information. The composite sync signals are separated into horizontal sync (HSYNC) and vertical sync (VSYNC) signals and are amplified by the receivers enclosed in box 501.

Figure 5:
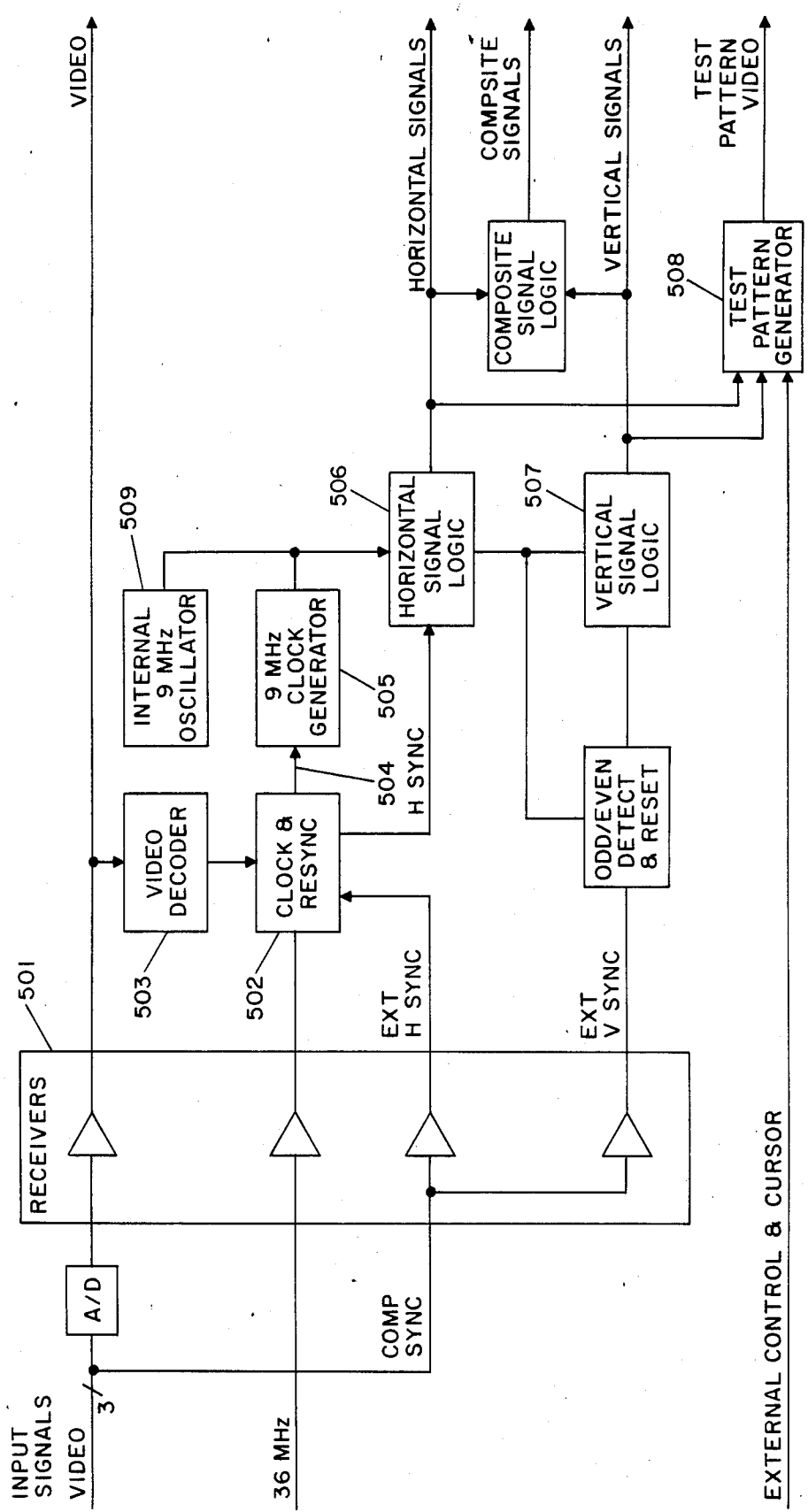
FIG. 5 is a block diagram of the synchronization circuitry of the present invention.

Referring to FIG. 5 the 36 MHz clock signal and the horizontal sync signal are provided to clock and resync block 502 which performs the function of aligning the synchronizer output signals to the external system. This alignment is accomplished by utilizing the known timing relationship between the 36 MHz clock, the horizontal sync and the video signal which is provided by video decoder 503. The clock and video signals are accurately aligned and controlled as received by the clock and resync block 502.

Figure 7:
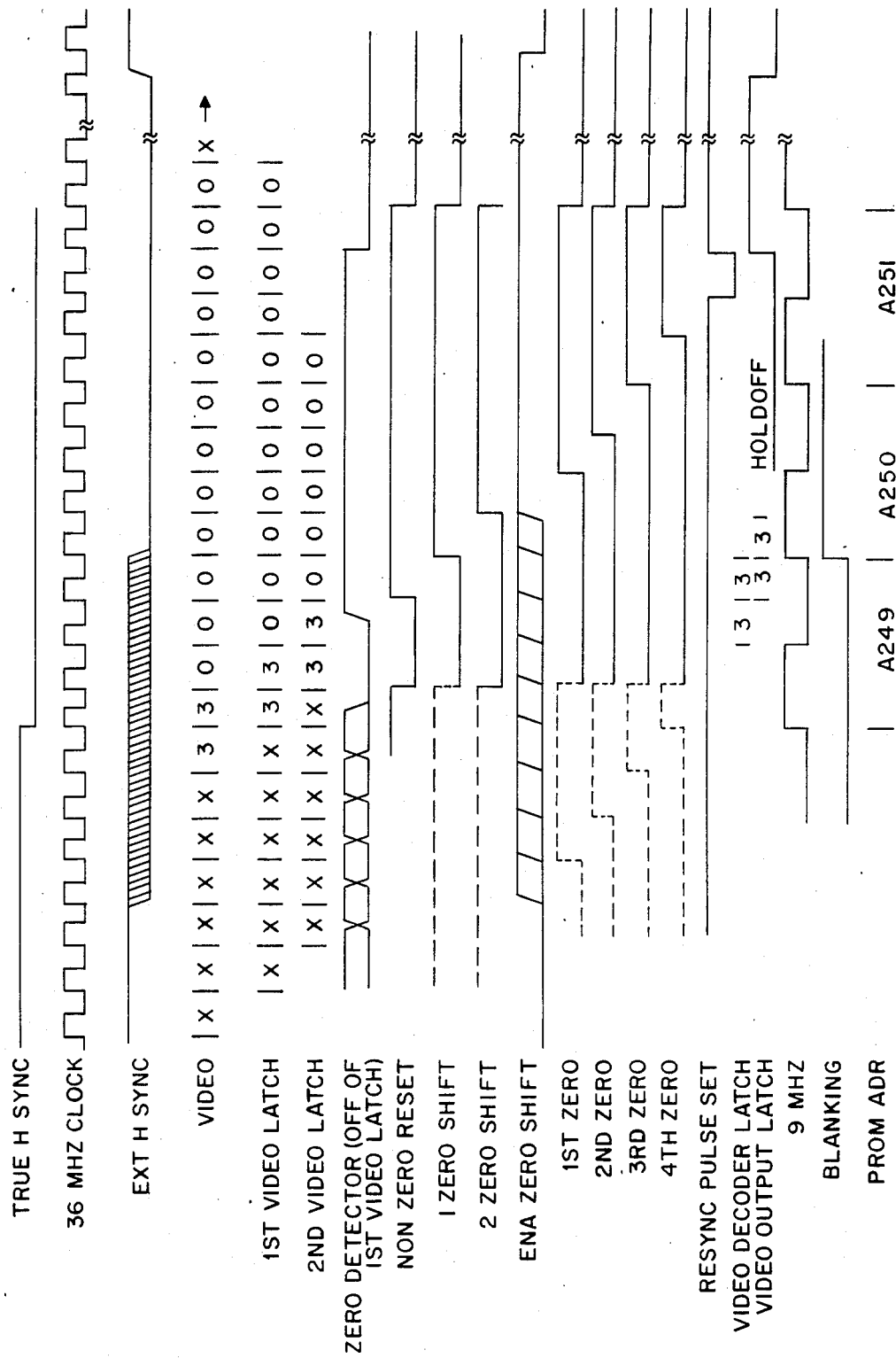
FIG. 7 is a timing diagram of the clock and resync circuit of FIG. 6.

A resync pulse is provided via line 504 to a 9 MHz clock generator 505. The resync pulse forces the 9 MHz generator to output the rising edge of its clock coincident with the second border black pixel from the video output latch as will be discussed below with regard to the timing diagrams shown in FIG. 7. The resync pulse also resets the horizontal counters to address zero bringing all the horizontal signals developed at the horizontal PROMs in line with the external sync.

Figure 8:
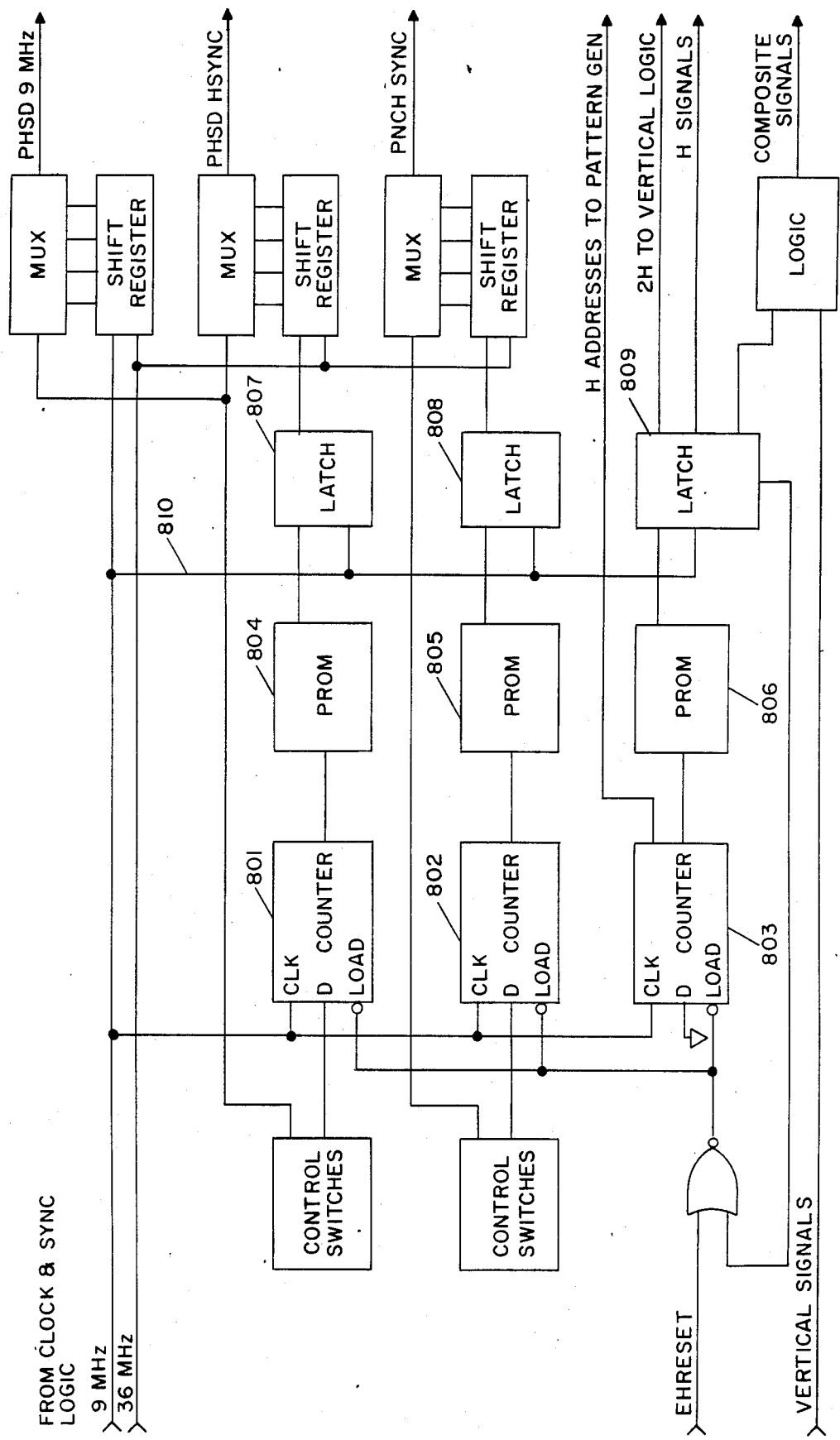
FIG. 8 is a block diagram of the horizontal logic circuit of the synchronization circuitry of FIG. 5.

The horizontal signal logic block 506 generates the horizontal signals through the standard use of counters, proms and latches. A detailed block diagram of the horizontal circuits is shown in FIG. 8. The waveforms are developed from the fact that there are 252 9 MHz clocks in the horizontal interval. Each clock pulse increments counters 801, 802 and 803 which addresses PROMS 804, 805 and 806. Each output waveform is divided into 252 elements and programmed into the prom starting at address 249, a reset is programmed into the prom at address 251 that resets the address counter to zero and gives free run capability to the synchronization circuit. Output latches 807, 808 and 809 on the prom outputs keep the signals aligned to the 9 MHz clock via line 810.

Figure 9:
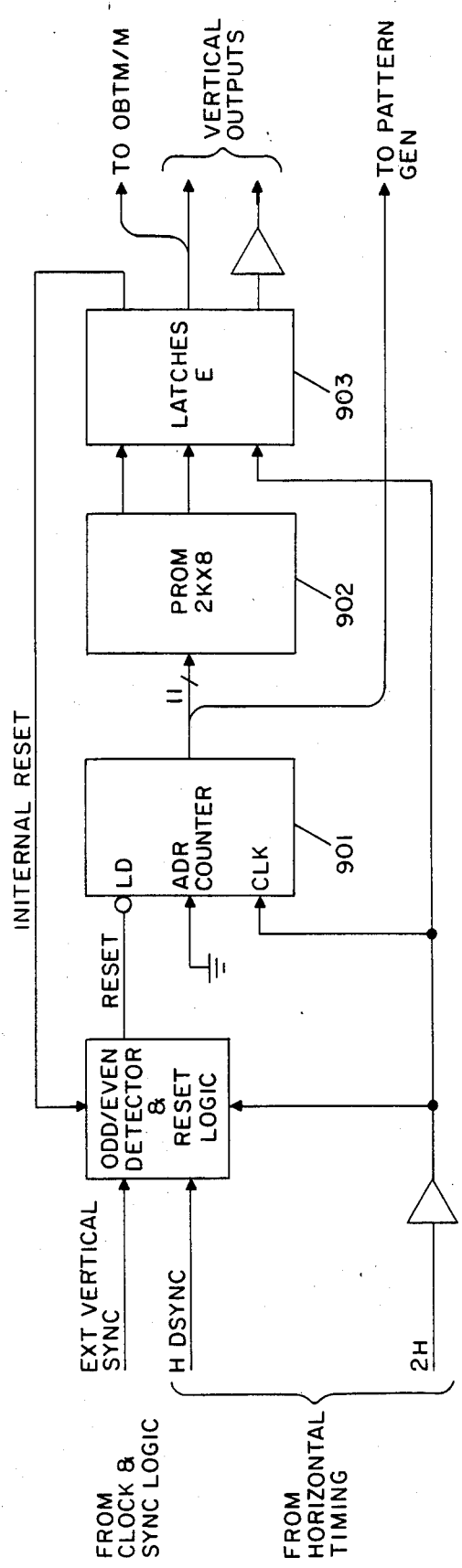
FIG. 9 is a block diagram of the vertical logic circuit of the synchronization circuitry of FIG. 5.

Vertical signal logic 507 is shown in greater detail in FIG. 9 and functions similar to the horizontal signal logic 506 shown in FIG. 8 in that counter 901, proms 902 and latches 903 are used to develop the vertical output signals. These waveforms are developed by the fact that there are 1974 2H (twice horizontal frequency) clocks during the vertical interval or frame. Each 2H clock increments one of the counters 901 and is used to address one of the vertial proms 902. Each vertical waveform is divided into 1974 elements and programmed into proms 902 starting at address zero. A reset programmed into the proms at address 1973 resets the address counter to zero and allows free run capability. Output latches 903 on the prom output keep the signal aligned to the clock.

Test pattern generator 508 provides a cross-hatch pattern or color bar pattern. These patterns are generated in proms that are controlled by the horizontal and vertical address counters. The vertical lines of the cross-hatch pattern are programmed into the horizontal prom as is the color bar pattern. The horizontal lines of the cross-hatch pattern are programmed into the vertical prom. The outputs of the proms are pipelined through latches up to the 36 MHz clock and combined with the video stream. Signals external to the board control pattern select and enable.

The horizontal sync need not be precisely aligned due to the method of detection used by the synchronization circuit. As shown in the clock and resync timing diagram of FIG. 7, true horizontal sync occurs at the rising edge of the clock between the last border black video pixels (code 3) that are on the front porch of the horizontal sync pulse. The video pixels following this are code zero (magenta) for the entire horizontal sync pulse interval. External horizontal sync may fall up to four pixels ahead or behind the true horizontal sync as the synchronizer is detecting the crossover point of border black code 3 to magenta code zero. The border black code 3 (or any code but zero) resets the detection logic. Seven continuous zeros are then detected and external horizontal sync, which generates the enable zero shift signal, allows a zero shift to propagate through a shift register to generate the resync pulse. The hardware used to achieve this result is represented by the block diagram of FIG. 6.

The recovered 36 MHz pixel clock is divided by 4 in the timing circuit to produce the 9 MHz clock 505 and a synchronized reset signal. The reset signal is synchronized with the external horizontal sync signal. The timing circuit also contains a free running 9 MHz oscillator 509 which is output by the timing circuit whenever the external clock is lost. This clock enables the monitor to free run, as discussed above, and generate the timing signals required for the internal operation of the monitor.

The 9 MHz clock and external horizontal reset signal are then then utilized by the horizontal timing circuit 506 to develop specific horizontal timing waveforms which are synchronized to the external sync. The horizontal timing circuit utilizes standard proms to generate the horizontal timing signals. The proms are driven by address counters which are clocked by the 9 MHz clock 505 and initialized by the external horizontal reset signal. In the free running mode, the 9 MHz clock 509 is provided and the counters are loaded by an internal horizontal reset signal generated by the proms. This enables the horizontal timing generation when external sync is lost.

Similarly, the external vertical sync signal from the vertical sync receiver and horizontal timing signals generated by the horizontal timing circuit are used by the vertical timing circuit 507 to develop specific vertical timing waveform signals used throughout the monitor. The vertical timing signals are also developed by proms.

Figure 6:
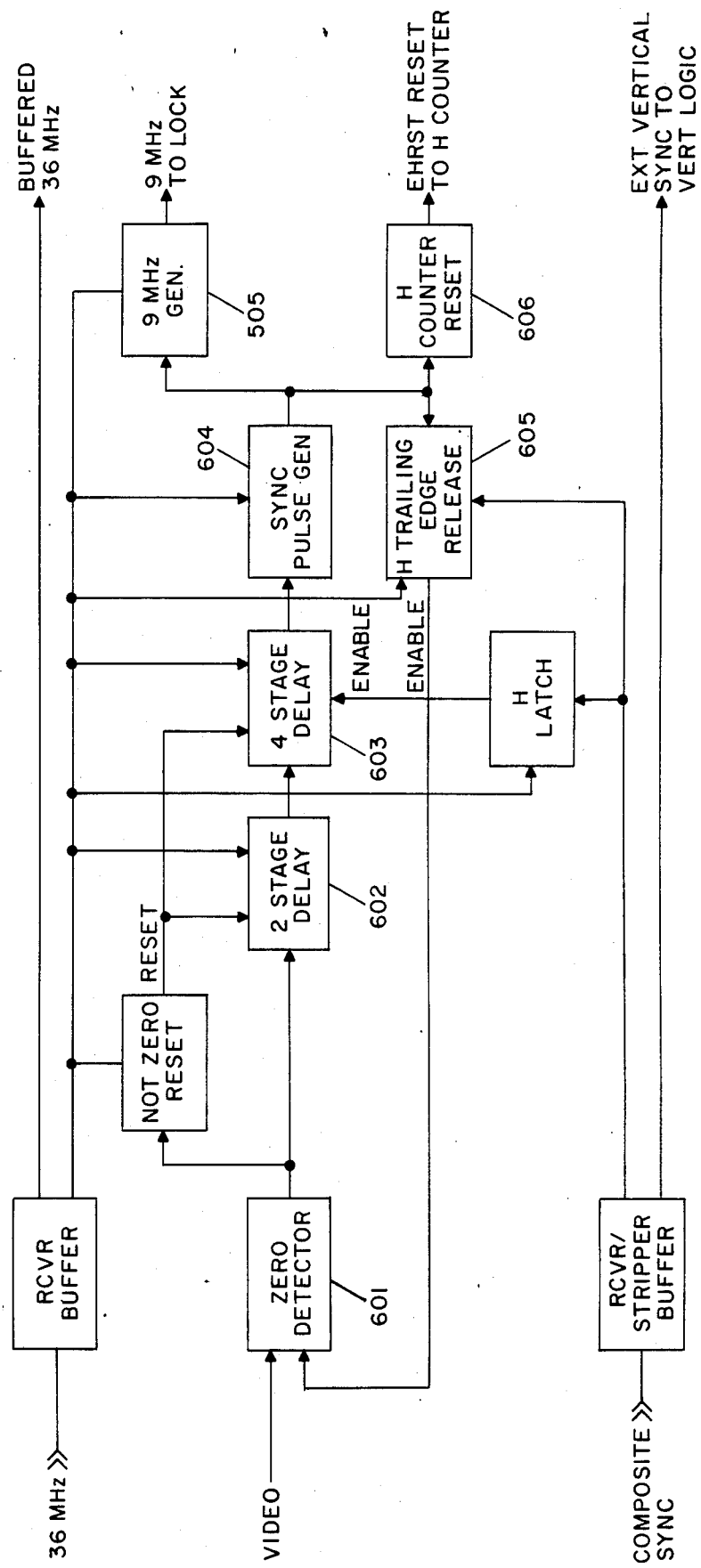
FIG. 6 is a block diagram of the clock and resync circuit of the synchronization circuitry of FIG. 5.

As shown in FIG. 6, zero detector 601 detects the horizontal sync pulse as described above employing two stage delay 602 and four stage 603 in order to detect the external horizontal sync which may fall up to four pixels ahead or behind the true horizontal sync. Sync pulse generator 604 provides a sync pulse to the horizontal trailing edge release 605 which enables the zero detector 601 and resets the horizontal counter 606.

There has thus been described a color television monitor in which a digital convergence circuit is used in order to generate a highly accurate and precise display. Although only a preferred embodiment is specifically illustrated and described herein, it will be appreciated that many modifications and variations of the present invention are possible in light of the above teachings and within the purview of the appended claims without departing from the spirit and intended scope of the invention.

What is claimed is:

1. A color video monitor having a high resolution display, comprising:
   first means for amplifying an input video signal;
   second means for producing color convergence signals;
   third means connected to receive said color convergence signals from said second means for providing a vertical deflection signal and color convergence driver signals for said color video monitor;
   fourth means connected to the third means for providing a horizontal deflection signal and a dynamic focus signal for said color video monitor;
   a cathode ray tube;
   means coupled to said cathode ray tube for receiving said color convergence driver signals, said vertical deflection signal and said horizontal deflection signal for controlling the display on said cathode ray tube; and
   fifth means synchronizing said second, third and fourth means to an external clock and its associated video input signal including horizontal synchronization pulses and vertical synchronization pulses, said color convergence signals, said vertical deflection signals and said horizontal deflection signals each being synchronized to said external clock.

2. The color video monitor of claim 1, wherein said second means for producing color convergence signals comprises a plurality of:
   interpolation means connected to receive the output from a memory means providing vertical convergence values, said interpolation means interpolating between successive vertical convergence values and providing an output representing a smooth convergence change between lines;
   conversion means connected to the output of said interpolation means for converting said output from a digital signal to an analog signal; and
   filter means for smoothing said analog signal prior to its application to said means for providing the convergence driver function.

3. The color video monitor of claim 2, wherein said memory means stores a matrix of 63×480 convergence values.

4. The color video monitor of claim 3, wherein 30 basic vertical convergence values and 480 lines of information are stored in said memory means such that each vertical convergence value is used to converge 16 lines of information.

5. The color video monitor of claim 2, wherein each of said plurality of interpolation, conversion and filter means is connected to a respective plurality of memory means, such that a separate one of said plurality of means for producing color convergence signals provides convergence functions for one of red, green, blue and lateral blue convergence signals.

6. The color video monitor of claim 1 wherein said fifth means for synchronizing includes a clock and re-sync means for aligning the clock, the video signals and the horizontal synchronization pulses.

7. The color video monitor of claim 1 further including a free running clock and means for substituting the free running clock for the clock in the event that pulses from the clock cannot be detected.

* * * * *